June 13, 1939.     T. PERRI     2,162,314
POULTRY FOUNTAIN
Filed Aug. 5, 1938
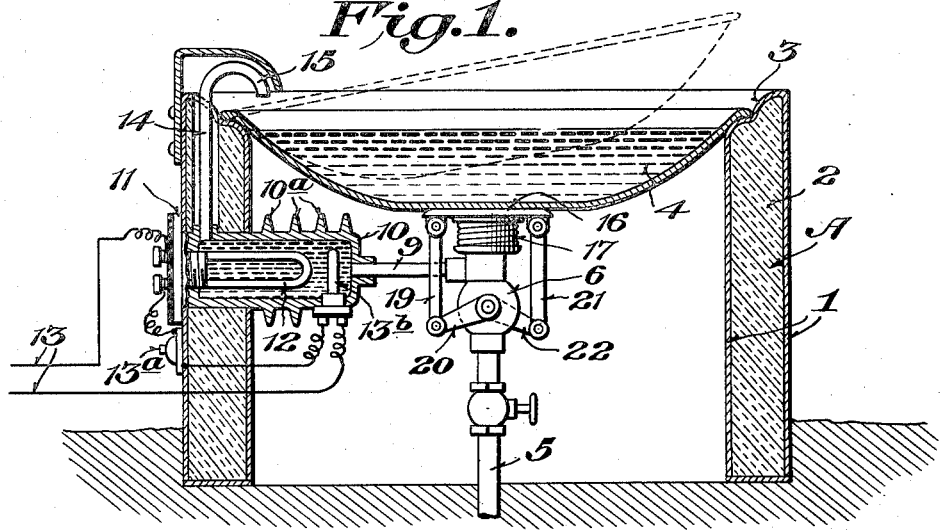
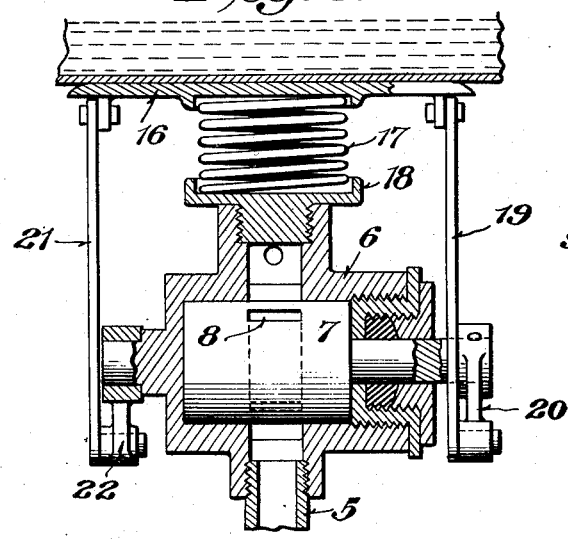
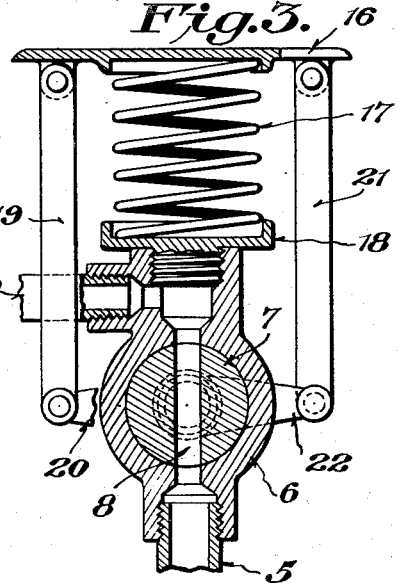
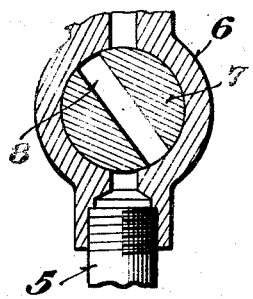
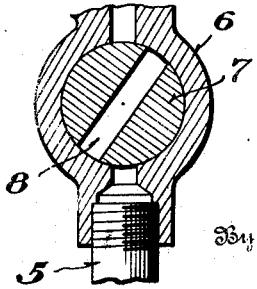
Inventor
Thomas Perri,
Attorney Patented June 13, 1939

2,162,314

UNITED STATES PATENT OFFICE 2,162,314

POULTRY FOUNTAIN

Thomas Perri, Toms River, N. J.

Application August 5, 1938, Serial No. 223,314

2 Claims. (Cl. 119—73)

This invention relates to poultry watering devices, and more particularly to a device which prevents the water from freezing in winter.

A primary object of the invention is to provide a construction which not only heats the source of water supply as well as the drinking water, but also automatically controls the source of supply in such a way that drinking water is rendered automatically available under all conditions of use. In that connection the invention contemplates a drinking receptacle which directly operates the supply valve. In other words, when the receptacle is full, the water supply is automatically cut-off, and, on the other hand, when the quantity of water in the receptacle becomes lessened either by use or evaporation, fresh water will be automatically supplied.

A further object of the invention is to provide a novel housing for the water supply means in which the receptacle for drinking water constitutes the cover. The receptacle may be readily removed when desired for cleaning and the mere act of lifting the receptacle will cut off the water supply. When the receptacle is replaced it is only necessary to manually press the same toward its seat until it becomes sufficiently filled with water to actuate the valve and eventually cut-off the source of supply by the weight of the water contained therein.

A still further object of the invention is to provide a novel mounting for the receptacle, which mounting in turn controls the water supply valve.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawing in which:

Figure 1 is a vertical sectional view of the improved device.

Figure 2 is an enlarged detail view of the receptacle mounting and the means for controlling the water supply valve.

Figure 3 is a sectional view taken at right angles to Figure 2 illustrating the mechanism of Figure 2 with the spring partially expanded and the valve turned midway to filling position.

Figures 4 and 5 are diagrammatic views illustrating respectively the position of the water supply valve when the supply of water is cut-off due to the receptacle being adequately filled and when the receptacle is lifted from its supporting saddle.

Similar reference characters designate corresponding parts throughout the several figures of the drawing.

In the embodiment illustrated the invention includes in its organization a housing designated generally as A and preferably including the side walls 1—1 filled with insulation 2, the said housing being adapted to be positioned on the ground so that its lower end may be covered with earth. The upper edge of the casing A is formed with a receptacle seat 3 for the purpose of receiving a receptacle 4 which also constitutes the cover for the housing. The receptacle 4 is preferably in the form of a pan, and, as will be apparent from the drawing, is intended to have its outer edge or rim rest in the seat 3 when it is filled with water.

Within the housing A there is provided a water supply pipe 5 having a valve casing 6 at the upper end thereof including a plug valve 7, provided with a passageway 8, for controlling the supply of water to a pipe extension 9 leading to a casing 10. This casing is preferably in the form of a casting mounted in the side wall of the housing and has an exterior sealing cap 11. The portion of the casing 10 within the housing is provided with heat radiating fins 10a on its exterior. The cap 11 carries therewith a heating element 12 of any approved type, the said heating element being connected with a suitable source of electric current supply 13. A manual switch 13a is provided for controlling the current and a thermal switch 13b is employed for keeping the water in the casing 10 at the selected temperature.

The casing 10 is also provided with the discharge pipe 14 whose upper end is curved downwardly as indicated at 15 to direct water into the receptacle 4.

The receptacle 4 rests on and is carried by a saddle plate 16 which is normally urged upwardly by a coil spring 17 whose lower end is mounted on a stationary support 18 carried by the valve casing 6. The saddle 16 is connected by the link 19 with the arm 20 of the plug valve 7. To balance the saddle plate in its upward and downward movement the idler links 21 and 22 are also employed at the end of the valve casing opposite the link 19. The idler links merely serve to guide the saddle plate 16 in its movement to insure proper operation of the link 19 which controls the valve 7 through the lever 20.

Assuming that the device is adjusted for winter operation it will be understood that the heating element 12 is supplied with electric current from the wires 13 by turning the switch 13a to its closed position. If the pan 4 resting on the saddle plate 16 is only partly filled, water will enter through the discharge pipe 15 due to the fact that the valve 7 is so positioned that its passageway 8 will permit water to flow from the supply pipe 5 to the casing 10 which, as previously indicated, communicates with the discharge pipe 15. As the pan becomes filled, it settles under the weight of its contents and ultimately closes the valve. If it is desired to clean the pan 4 it is simply necessary to lift it from the seat 3. When the pan 4 is removed, the spring 17 will push the saddle 16 to its upper limit, thereby causing the link 19 to close the valve and effectively cutting off the supply of water to the pan.

From the foregoing it will be apparent that the present construction provides a receptacle or pan which not only constitutes a removable cover for the housing, but also due to its varying weight caused by the varying volume of water therein will also automatically keep the pan filled to the proper level. Due to the fact that the spring 17 collapses when the pan is full, it will be impossible for the pan to automatically be overfilled and thus overflow. The casing 10 not only heats the water supplied to the pan 4, but also radiates heat within the housing A which will normally prevent the water in the pan freezing.

I claim:

1. A poultry fountain including a housing, a receptacle for holding drinking water forming a removable cover for the housing, a source of water supply within the housing, a valve, a pipe line between said valve and said receptacle, said pipe line including a water tight casing located within the housing, an electrical heating element within the casing for heating the water flowing through said pipe line, and means for yieldingly supporting said receptacle associated with said valve, said means being actuated by the weight of the contents of the receptacle automatically to control the flow of water thereto.

2. A poultry fountain including an insulated housing having its upper edge formed as a receptacle seat, a receptacle removably fitted to said seat and adapted to hold drinking water, a water supply pipe led into the housing beneath the receptacle, a valve for said pipe, a branch pipe leading from said valve, a casing having an electrical heating element therein communicating with said branch pipe, a discharge pipe leading from the casing to the receptacle, a saddle for supporting the central portion of the bottom of the receptacle, a coil spring mounted on the water supply pipe and engaging beneath the saddle plate to normally urge the same upwardly, and link means connecting the saddle with the valve to cause the latter to be operated by the weight of the receptacle on the saddle.

THOMAS PERRI.